United States Patent
Hazzard et al.

(10) Patent No.: US 8,240,121 B2
(45) Date of Patent: Aug. 14, 2012

(54) RETROFIT DIRT SEPARATOR FOR GAS TURBINE ENGINE

(75) Inventors: Robert L. Hazzard, Windsor, CT (US); Joel H. Wagner, Wethersfield, CT (US); Edward M. Henrahan, South Windsor, CT (US); Ryan Shepard Levy, Middletown, CT (US); Takao Fukuda, Wethersfield, CT (US); Eric A. Grover, Tolland, CT (US); Paul Smith, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 1354 days.

(21) Appl. No.: 11/942,962

(22) Filed: Nov. 20, 2007

(65) Prior Publication Data
US 2009/0126337 A1    May 21, 2009

(51) Int. Cl.
*F02G 3/00*    (2006.01)
(52) U.S. Cl. ........... 60/39.092; 60/796; 55/306; 55/511; 415/121.2; 29/889.02
(58) Field of Classification Search ............... 60/39.092, 60/796–798, 772; 55/306, 511; 415/121.2; 29/889.2
See application file for complete search history.

(56) References Cited

U.S. PATENT DOCUMENTS

| | | | |
|---|---|---|---|
| 3,034,298 A | 5/1962 | White | |
| 3,449,891 A * | 6/1969 | Amelio et al. | 55/306 |
| 3,811,254 A * | 5/1974 | Amelio | 55/306 |
| 3,970,439 A | 7/1976 | Murphy | |
| 4,309,147 A * | 1/1982 | Koster et al. | 416/95 |
| 4,617,028 A * | 10/1986 | Ray et al. | 95/267 |
| 4,685,942 A | 8/1987 | Klassen | |
| 4,798,047 A | 1/1989 | Geary | |
| 4,820,123 A | 4/1989 | Hall | |
| 4,860,534 A * | 8/1989 | Easley et al. | 60/39.092 |
| 4,928,480 A * | 5/1990 | Oliver et al. | 60/39.092 |
| 5,039,317 A | 8/1991 | Thompson | |
| 6,464,455 B2 * | 10/2002 | Wilson | 415/121.2 |
| 6,508,052 B1 * | 1/2003 | Snyder et al. | 60/39.092 |
| 6,698,180 B2 * | 3/2004 | Snyder | 60/39.092 |
| 6,969,237 B2 | 11/2005 | Hudson | |
| 7,326,031 B2 * | 2/2008 | O'Neill et al. | 415/121.2 |
| 7,608,122 B2 * | 10/2009 | Snyder | 55/306 |
| 7,634,984 B2 * | 12/2009 | Stelzer et al. | 123/198 E |
| 7,770,375 B2 * | 8/2010 | Alvanos et al. | 60/39.091 |
| 2007/0048125 A1 | 3/2007 | Chou | |
| 2007/0119145 A1 | 5/2007 | O'Neill | |
| 2008/0310951 A1 * | 12/2008 | Bremer | 415/121.2 |

* cited by examiner

*Primary Examiner* — William H Rodriguez
(74) *Attorney, Agent, or Firm* — Carlson, Gaskey & Olds, PC

(57) ABSTRACT

A dirt separator may be retrofit into existing gas turbine engines since it is formed of circumferentially separate pieces which may be assembled together in the gas turbine engine.

13 Claims, 3 Drawing Sheets

RETROFIT DIRT SEPARATOR FOR GAS TURBINE ENGINE

The government may have certain rights to this invention pursuant to Contract No. F33657-99-D-2051 awarded by the United States Air Force.

BACKGROUND OF THE INVENTION

This application relates to a dirt separator for a gas turbine engine formed of separate pieces that can be assembled together in the gas turbine engine such that it can be retrofit into existing gas turbine engines.

Gas turbine engines are known, and typically include a fan section delivering air to a compressor section. The air is compressed and delivered downstream into a combustor section within which the air is mixed with fuel and then combusted to release energy. The products of this combustion process proceed downstream into the turbine and over a set of turbine airfoils, driving the turbine blades to rotate as they extract energy from the flow.

The turbine typically includes a plurality of rotating blades and static vanes. Since the products of combustion are hot, both the blades and the vanes are provided with a thermal protection mechanism involving cooling air. Typically, the cooling air is delivered as a redirected portion of the pre-combustion compressor air into the turbine airfoils. The cooling air structure within both the blades and vanes include relatively small holes in the exterior surface of the airfoils so as to bathe the airfoil in a protective layer of relatively cooler air than the mainstream flow coming from the combustor.

When there are impurities such as dirt or sand in the cooling air, some of these holes can become clogged. This is undesirable as it may prevent the cooling air from adequately protecting the surface of the airfoil. This problem has become particularly acute recently with the increased use of gas turbine engines on aircraft within a desert environment.

New engine designs are often now provided with a dirt separator to address this concern. However, existing gas turbine engines may have cooling air flow passages for that do not easily lend themselves to the installation of a standard dirt separator. Standard dirt separators are generally formed of a single cylindrical, or frusto-conical piece. These separators may be difficult to install into existing gas turbine engines.

SUMMARY OF THE INVENTION

In a disclosed embodiment of this invention, a dirt separator for use in a gas turbine engine is provided by at least a pair of circumferentially separate components which can be inserted separately into the gas turbine engine.

These and other features of the present invention can be best understood from the following specification and drawings, the following of which is a brief description.

DETAILED DESCRIPTION OF THE PREFERRED EMBODIMENT

Figure 1:
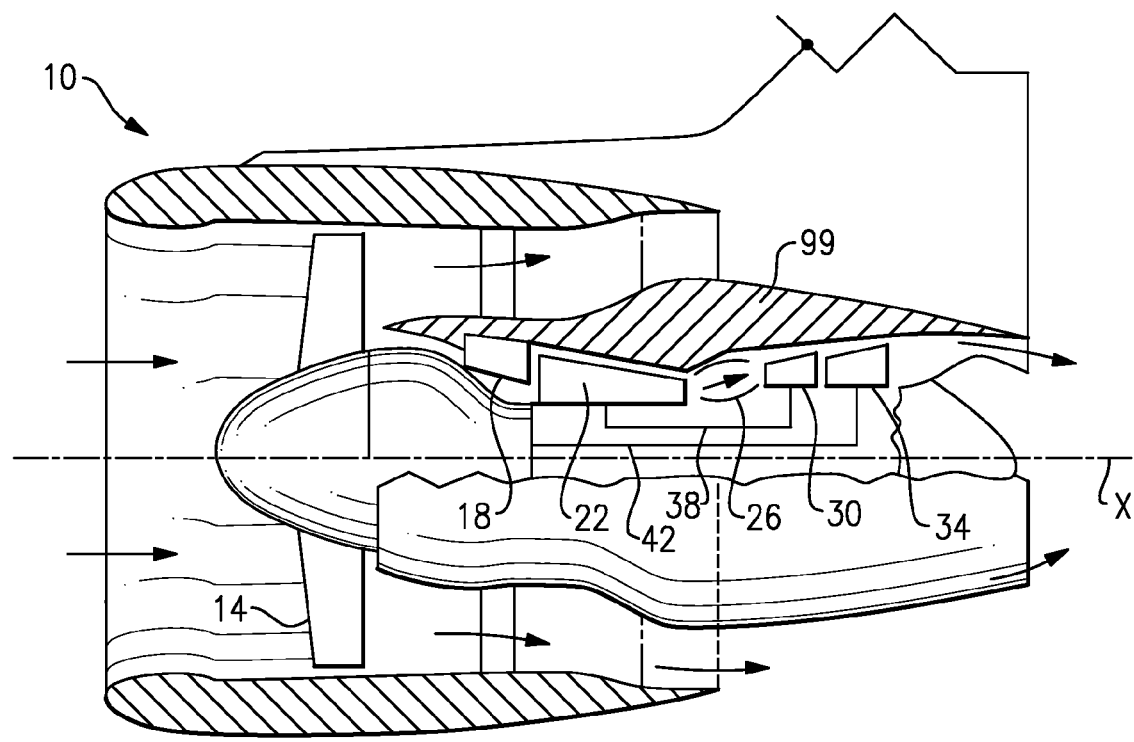
FIG. 1 is a cross-sectional view of a gas turbine engine.

A gas turbine engine 10, such as a turbofan gas turbine engine, circumferentially disposed about an engine centerline X, is shown in FIG. 1. The engine 10 includes a fan 14, compressors 18 and 22, a combustion section 26 and turbines 30 and 34. As is well known in the art, air compressed in the compressors 18 and 22 is mixed with fuel and burned in the combustion section 26, and expanded across turbines 30 and 34. Turbine blades with turbines 30 and 34 rotate in response to the expansion, which in turn drive the compressors 18 and 22, and fan 14. Turbines 30 and 34 are comprised of alternating rows of rotating airfoils, commonly referred to as blades, which are axially spaced from static airfoils, commonly referred to as vanes. This structure is shown schematically in FIG. 1. While one example gas turbine engine is illustrated, it should be understood this invention extends to any other type gas turbine engine for any application.

Figure 2:
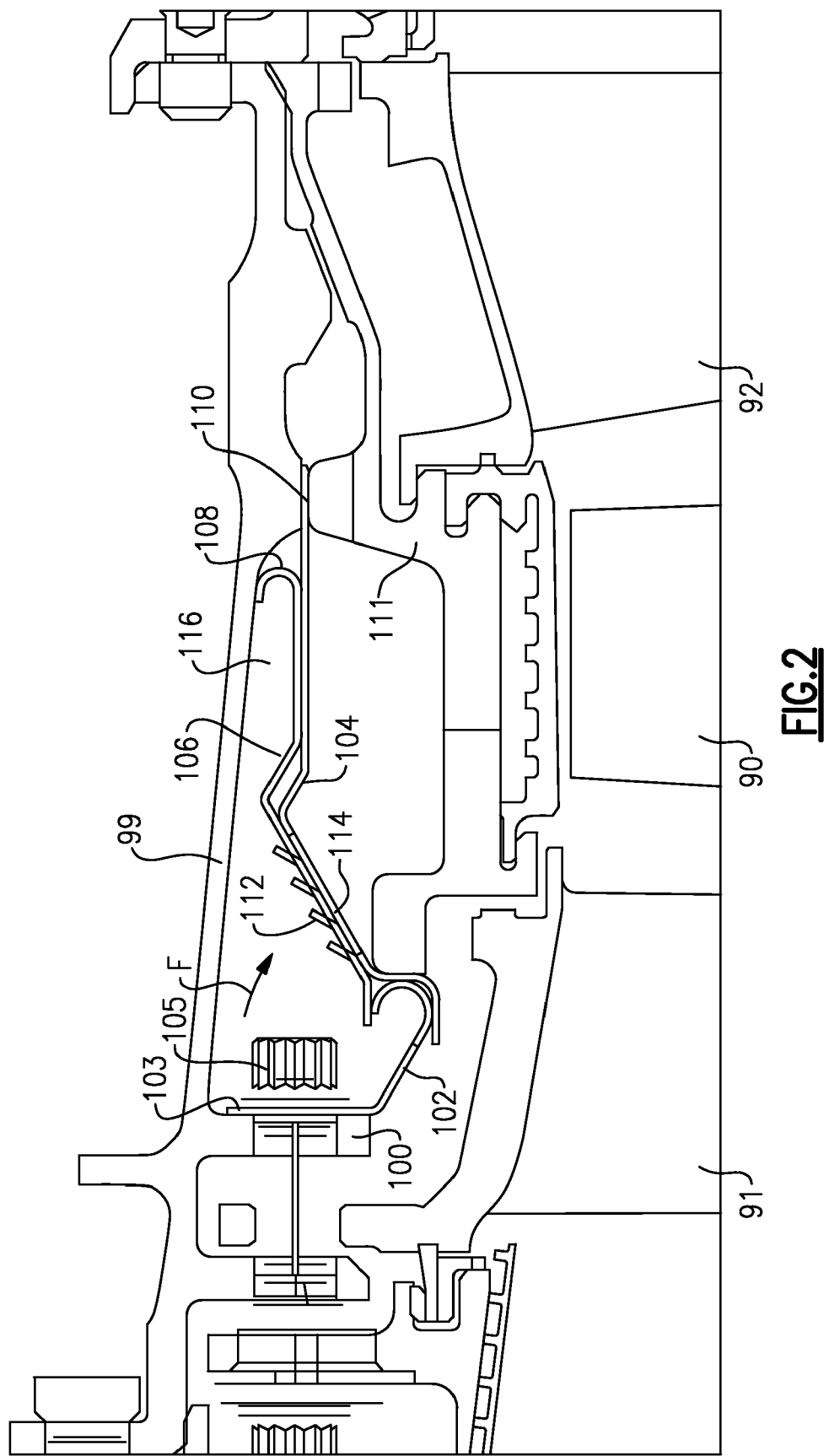
FIG. 2 shows a sectional portion of the FIG. 1 gas turbine engine.

FIG. 2 shows a dirt separator associated with a high pressure turbine, and having turbine blades 90, and vanes 91 and 92. A cooling air supply is utilized to cool the blade 90, vanes 91 and 92, and a blade outer air seal 111.

A plurality of case clevis tabs 100 extend radially inwardly from a core engine case 99. Flow passages are defined between the circumferentially spaced clevis tabs 100 such that air F can be delivered from an upstream location downstream as cooling air. A mount ring 102 has tabs 103 bolted at 105 to the clevis tabs 100. The mount ring 102 supports a dirt separator inner liner 104 and outer liner 106. As shown, outer liner 106 may be provided with a bend 108 to fit within the case 99, while inner liner 104 may be provided with a flange 110 to be held between a blade outer air seal support 111, and an inner surface of the case 99. As shown, louvers 112 may be formed in the outer liner 106 to divert dirt or other impurities in the air F into a collection area 116. An opening 114 may be formed in the inner liner 104 aligned with the louvers 112. The inner and outer liners may be welded together.

Figure 3:
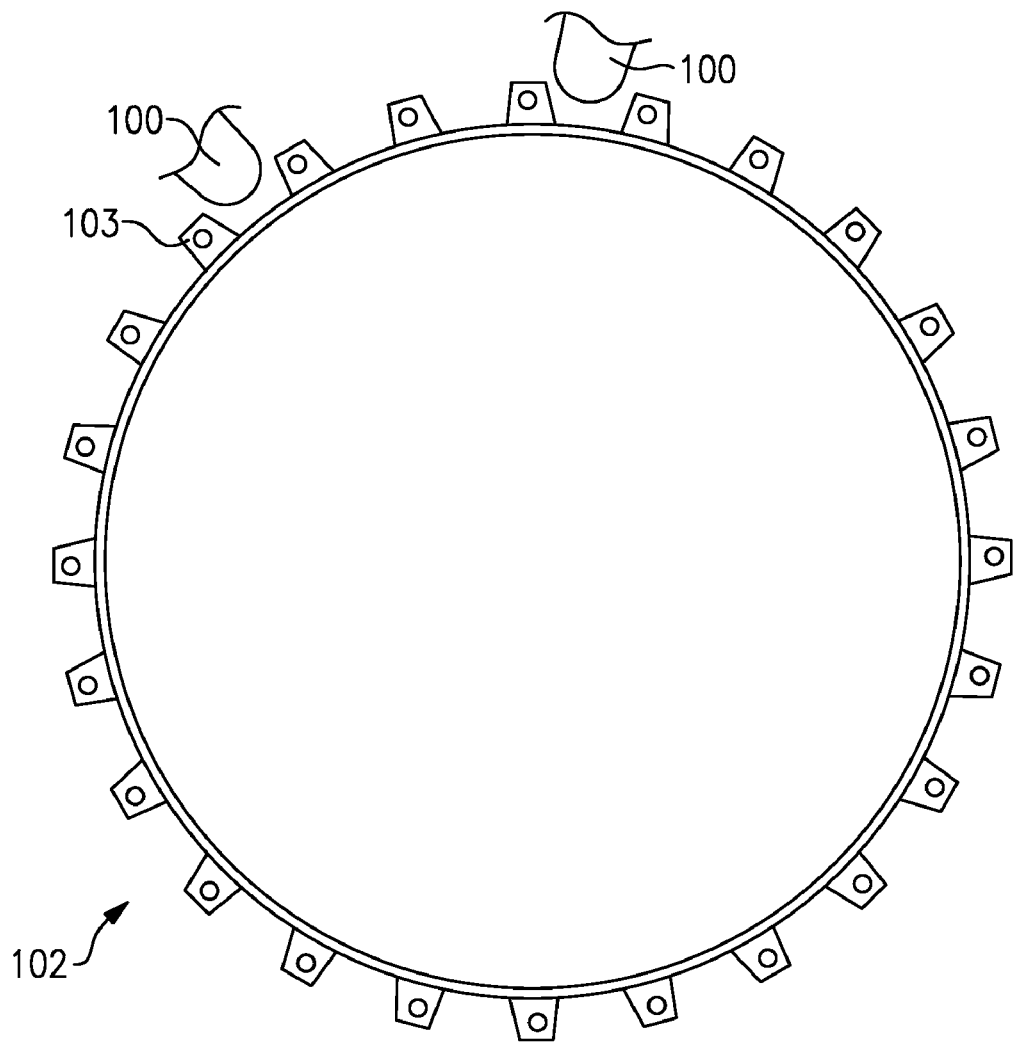
FIG. 3 shows one component of a dirt separator.

As shown in FIG. 3, the tabs 103 are circumferentially spaced. The support ring 102 may thus be inserted into the engine to the location shown in FIG. 2 by initially moving the tabs 103 between clevis tabs 100, until the ring is inside of the clevis tabs 100. The ring may then be turned such that the tabs 103 align with the clevis tabs 100, and the bolts 105 may then be inserted. While only two clevis tabs are illustrated, it should be understood that there will be many more circumferentially spaced tabs.

Figure 4:
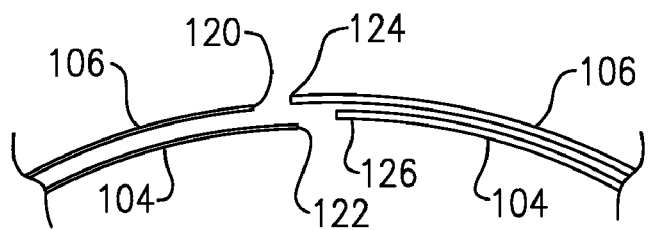
FIG. 4 shows another feature of the FIG. 2 dirt separator.

As shown in FIG. 4, the liner portions 104 and 106 are formed of two or more separate parts having ends 120, 122, 124 and 126 which overlap. Each of these circumferentially separate parts may be inserted separately, and then mounted on the support ring 102, and also supported by the circumferential overlap between the ends 120, 122, 124 and 126. That is, the end 122 sits radially underneath the end 124, and will serve to support the end 124, and hence the entire part. While FIG. 4 shows only two separate parts for the liners, there may be any number of separate parts.

With this invention, existing gas turbine engines can now be provided with a dirt separator, without any necessary modification to the engine casing.

While an embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a core engine casing;
   a turbine section within said core engine casing, and there being static vanes and rotating blades in said turbine section, and a space being defined radially inwardly of said core engine casing and in said turbine section, with a cooling air supply directed into said space;

a dirt separator mounted within said space, and in said turbine section, said dirt separator being formed of a plurality of circumferentially extending separate parts which are assembled separately into said core engine casing; and said core engine case has a plurality of radially inwardly extending clevis tabs, and said dirt separator including a support ring which is affixed to said clevis tabs.

2. A gas turbine engine comprising:

a core engine casing;

a turbine section within said core engine casing, and there being static vanes and rotating blades in said turbine section, and a space being defined radially inwardly of said core engine casing and in said turbine section, with a cooling air supply directed into said space;

a dirt separator mounted within said space, and in said turbine section, said dirt separator being formed of a plurality of circumferentially extending separate parts which are assembled separately into said core engine casing; and said separate parts include overlapping ends which circumferentially overlap and support opposed ends of an adjacent one of said plurality of separate parts.

3. The gas turbine engines as set forth in claim 2, wherein said dirt separator includes both an inner liner and an outer liner with said inner liner and said outer liner being secured together, and said overlapping ends include a circumferentially extending end of said inner liner on one end of one of said adjacent one of said separate parts which underlies and supports a circumferentially extending end of said outer liner of the adjacent one of said separate parts.

4. A gas turbine engine comprising:

a core engine casing;

a turbine section within said core engine casing, and there being static vanes and rotating blades in said turbine section, and a space being defined radially inwardly of said core engine casing and in said turbine section, with a cooling air supply directed into said space;

a dirt separator mounted within said space, and in said turbine section, said dirt separator being formed of a plurality of circumferentially extending separate parts which are assembled separately into said core engine casing; and said dirt separator is provided with a plurality of louvers which serve to direct dirt and other impurities radially outwardly.

5. The gas turbine engine as set forth in claim 4, wherein said dirt separator includes a collection space and said louvers are for directing dirt into said collection space.

6. A dirt separator for a gas turbine engine comprising:

a plurality of circumferentially extending separate parts which are assembled together into a turbine section of a gas turbine engine; and said dirt separator includes a support ring which is affixed to clevis tabs on a core engine casing.

7. A dirt separator for a gas turbine engine comprising:

a plurality of circumferentially extending separate parts which are assembled together into a turbine section of a gas turbine engine; and said separate parts include overlapping ends which circumferentially overlap and support opposed ends of an adjacent one of said plurality of separate parts.

8. The dirt separator as set forth in claim 7, wherein said dirt separator includes both an inner liner and an outer liner with said inner liner and said outer liner being secured together, and said overlapping ends include a circumferentially extending end of said inner liner on one end of one of said adjacent one of said separate parts which underlies and supports a circumferentially extending end of said outer liner of the adjacent one of said separate parts.

9. A dirt separator for a gas turbine engine comprising:

a plurality of circumferentially extending separate parts which are assembled together into a turbine section of a gas turbine engine; and said dirt separator is provided with a plurality of louvers which serve to direct dirt and other impurities radially outwardly.

10. The dirt separator as set forth in claim 9, wherein said dirt separator includes a collection space and louvers are for directing dirt into said collection space.

11. A method of assembling a dirt separator into a gas turbine engine comprising the steps of:

providing a plurality of circumferentially separate dirt separator parts, and moving said dirt separator parts into a cooling air flow path in a turbine section of a gas turbine engine, and then assembling said dirt separator parts together.

12. The method of claim 11, wherein a support ring supports said separate parts of said dirt separator in the cooling air flow path.

13. The method of claim 12, wherein said support ring includes a plurality of circumferentially spaced tabs, and a core engine casing includes a plurality of circumferentially spaced clevis tabs, with said tabs on said support ring being moved axially beyond said clevis tabs on said core engine casing by moving said tabs on said support ring through spaces between said clevis tabs on said core engine casing, and then rotating said support ring to align said tabs on said support ring with said clevis tabs on said core engine casing, and attaching said support ring to said clevis'tabs on said core engine casing.

* * * * *